United States Patent
Islam et al.

(10) Patent No.: US 10,841,959 B2
(45) Date of Patent: Nov. 17, 2020

(54) CONVEYING RACH INFORMATION THROUGH PBCH

(71) Applicant: QUALCOMM Incorporated, San Diego, CA (US)

(72) Inventors: Muhammad Nazmul Islam, Littleton, MA (US); Tao Luo, San Diego, CA (US); Juergen Cezanne, Ocean Township, NJ (US); Sundar Subramanian, San Diego, CA (US); Junyi Li, Chester, NJ (US); Karl Georg Hampel, Hoboken, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/659,420

(22) Filed: Oct. 21, 2019

(65) Prior Publication Data

US 2020/0068621 A1    Feb. 27, 2020

Related U.S. Application Data

(63) Continuation of application No. 15/421,213, filed on Jan. 31, 2017, now Pat. No. 10,531,492.

(Continued)

(51) Int. Cl.
*H04W 74/08*    (2009.01)
*H04W 72/00*    (2009.01)
(Continued)

(52) U.S. Cl.
CPC ..... *H04W 74/0833* (2013.01); *H04W 72/005* (2013.01); *H04W 74/006* (2013.01); *H04W 88/02* (2013.01)

(58) Field of Classification Search
CPC .......... H04W 74/0833; H04W 74/006; H04W 72/005
See application file for complete search history.

(56) References Cited

U.S. PATENT DOCUMENTS

| 2014/0086173 A1 | 3/2014 | Sadeghi et al. |
| 2014/0098761 A1* | 4/2014 | Lee ........................ H04W 24/02 370/329 |

(Continued)

FOREIGN PATENT DOCUMENTS

WO    2014052412 A2    4/2014

OTHER PUBLICATIONS

International Search Report and Written Opinion—PCT/US2017/044853—ISA/EPO—dated Oct. 27, 2017.

(Continued)

*Primary Examiner* — Ricky Q Ngo
*Assistant Examiner* — Stephen N Steiner
(74) *Attorney, Agent, or Firm* — Procopio, Cory, Hargreaves & Savitch LLP

(57) ABSTRACT

In millimeter wave systems, user equipment may not be able to receive RACH parameters through a PDCCH when the information is transmitted with an omni-directional beam. In an aspect of the disclosure, an apparatus, such as a base station, may determine the RACH parameters and transmit a subset of the RACH parameters via a PBCH. The user equipment may receive the RACH parameter subset and initiate a RACH procedure.

30 Claims, 14 Drawing Sheets

Related U.S. Application Data

(60) Provisional application No. 62/377,490, filed on Aug. 19, 2016.

(51) Int. Cl.
H04W 74/00 (2009.01)
H04W 88/02 (2009.01)

(56) References Cited

U.S. PATENT DOCUMENTS

| | | |
|---|---|---|
| 2014/0348051 A1 | 11/2014 | Park et al. |
| 2015/0103800 A1 | 4/2015 | Seo et al. |
| 2015/0312887 A1 | 10/2015 | Xia et al. |
| 2015/0359003 A1* | 12/2015 | Kim ............... H04W 74/0891 370/336 |
| 2016/0044642 A1 | 2/2016 | Xu et al. |
| 2016/0119958 A1 | 4/2016 | Tan et al. |
| 2016/0183295 A1 | 6/2016 | Liu et al. |
| 2017/0048802 A1 | 2/2017 | Bucknell et al. |
| 2018/0054837 A1 | 2/2018 | Islam et al. |

OTHER PUBLICATIONS

Samsung: "Preliminary View on Initial Access in 5G," 3GPP TSG-RAN WG2 Meeting #93bis, R2-162300, Dubrovnik, Croatia, Apr. 4, 2016, XP051082676, Retrieved from the Internet: URL:http://www.3gpp.org/ftp/tsg_ran/WG2_RL2/TSGR2_93bis/Docs/, 3 pages.

Samsung: "System Information Signalling Design in NR", 3GPP Draft; R2-163371 System Information Signaling Design in NR, 3rd Generation Partnership Project (3GPP), Mobile Competence Centre, 650, Route Des Lucioles; F-06921 Sophia-Antipolis Cedex, France, vol. RAN WG2, Nanjing. China; May 23, 2016-May 27, 2016, May 22, 2016 (May 22, 2016). XP051104902, Retrieved from the Internet: URL: http://www.3gpp.org/ftp/Meetings_3GPP_SYNC/RAN2/Docs/ [retrieved on May 22, 2016].

Samsung: "System Information Signalling in NR", 3GPP Draft; R2-162215, 3rd Generation Partnership Project (3GPP), Mobile Competence Centre; 650, Route Des Lucioles; F-06921 Sophia-Antipolis Cedex; France, vol. RAN WG2, No. Dubrovnik, Croatia; Mar. 31, 2016, XP051081924, Retrieved from the Internet: URL:http://www.3gpp.org/ftp/tsg_ran/WG2_RL2/TSGR2_93bis/Docs/ [retrieved on Mar. 31, 2016], 7 pages.

* cited by examiner

CONVEYING RACH INFORMATION THROUGH PBCH

CROSS-REFERENCE TO RELATED APPLICATION(S)

This application is a continuation of U.S. application Ser. No. 15/421,213, entitled "CONVEYING RACH INFORMATION THROUGH PBCH" and filed on Jan. 31, 2017, which claims the benefit of U.S. Provisional Application Ser. No. 62/377,490, entitled "CONVEYING RACH INFORMATION THROUGH PBCH" and filed on Aug. 19, 2016, which are expressly incorporated by reference herein in their entireties.

BACKGROUND

Field

The present disclosure relates generally to communication systems, and more particularly, to conveying random access channel (RACH) information via a physical broadcast channel.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In millimeter wave systems, user equipment may not be able to receive system information through a common control channel when the system information is transmitted with an omni-directional beam. The foregoing discussion provides solutions to address this problem.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment becomes synchronized to the network using a RACH procedure consisting of a series of message exchanges between the user equipment and the network. Before performing the synchronization procedure, the user equipment may need certain RACH parameters from the network. If the network supports or utilizes millimeter wave systems, free space path loss and non-line-of-sight loss may be higher, and therefore, the user equipment often cannot receive the parameters through a common control channel that is transmitted via an omni-directional beam. In an aspect, transmissions may be beamformed, and the parameters may be transmitted using sweeping beams. Beam sweeps may lead to high overhead because of the amount of information associated with the parameters. One way to reduce the overhead is to reduce the frequency with which the messages containing the parameters are beam swept but this method may increase synchronization latency of user equipments. As such, a need exists to provide frequent and sufficient random access channel information to a user equipment to enable the user equipment to synchronize with the network without excessive latency.

As further discussed below, a base station may determine RACH parameters and transmit a message to the user equipment that includes RACH information. The RACH information may correspond to a subset of the RACH parameters and may be transmitted via a physical broadcast channel. The physical broadcast channel may be transmitted with a greater periodicity than other channels, which reduces the latency for uplink synchronization. By transmitting a subset of the RACH parameters, overhead is also minimized. Upon receiving the RACH information, the user equipment may initiate the RACH procedure.

In an aspect of the disclosure, a method, a computer-readable medium, and an apparatus are provided. The apparatus may be a base station. The apparatus may be configured to determine RACH parameters and to transmit a message that includes RACH information, based on the determined RACH parameters, via a physical broadcast channel.

In another aspect, a method of wireless communication by a base station is provided. The method includes determining RACH parameters and transmitting a message that includes RACH information, based on the determined RACH parameters, via a PBCH. In an aspect, the message that includes RACH information may be transmitted using beamforming. In another aspect, the message is beam-formed in a cell-specific manner by sweeping through one or more angular regions in a cell during different time units. In another aspect, the RACH parameters may include a beam sweep periodicity, a RACH preamble index, a RACH configuration, a RACH format, a RACH periodicity, a base station transmit power, and a RACH power ramping step. In another aspect, the RACH information may be a subset of the RACH parameters. In another configuration, the method may include transmitting via the PBCH an indication of whether the determined RACH parameters are to be transmitted via an ePBCH. In an aspect, the RACH information may be transmitted via the PBCH based on whether the determined RACH parameters are to be transmitted via the ePBCH. In another configuration, the method may include transmitting via the PBCH an indication of a periodicity with which the determined RACH parameters are to be transmitted via an ePBCH. In another configuration, the method may include transmitting at least a subset of the determined RACH parameters via a SIB. In another aspect, the at least the subset of the determined RACH parameters may be transmitted in a cell-specific manner by sweeping through one or more angular regions in a cell. In another aspect, the SIB is transmitted via an ePBCH. In another aspect, the SIB is transmitted via a PDCCH or a PDSCH. In another configuration, the method may include transmitting at least a subset of the determined RACH parameters during a RACH procedure. In an aspect, the PBCH is transmitted in a synchronization subframe. In another aspect, the PBCH is transmitted in a subframe which does not contain synchronization signals. In another aspect, the PBCH is frequency-division multiplexed with initial access signals, or the PBCH is time-division multiplexed with the initial access signals. In another aspect, the initial access signals may include one or more of a primary synchronization sequence, a secondary synchronization sequence, an extended synchronization sequence, and beam reference signals.

In another aspect, an apparatus (e.g., a base station) is provided for wireless communication. The apparatus may include means for determining RACH parameters and means for transmitting a message that includes RACH information, based on the determined RACH parameters, via a PBCH. In an aspect, the message that includes RACH information may be transmitted using beamforming. In another aspect, the message is beam-formed in a cell-specific manner by sweeping through one or more angular regions in a cell during different time units. In another aspect, the RACH parameters may include a beam sweep periodicity, a RACH preamble index, a RACH configuration, a RACH format, a RACH periodicity, a base station transmit power, and a RACH power ramping step. In another aspect, the RACH information may be a subset of the RACH parameters. In another configuration, the apparatus may include means for transmitting via the PBCH an indication of whether the determined RACH parameters are to be transmitted via an ePBCH. In an aspect, the RACH information may be transmitted via the PBCH based on whether the determined RACH parameters are to be transmitted via the ePBCH. In another configuration, the apparatus may include means for transmitting via the PBCH an indication of a periodicity with which the determined RACH parameters are to be transmitted via an ePBCH. In another configuration, the apparatus may include means for transmitting at least a subset of the determined RACH parameters via a SIB. In another aspect, the at least the subset of the determined RACH parameters may be transmitted in a cell-specific manner by sweeping through one or more angular regions in a cell. In another aspect, the SIB is transmitted via an ePBCH. In another aspect, the SIB is transmitted via a PDCCH or a PDSCH. In another configuration, the apparatus may include means for transmitting at least a subset of the determined RACH parameters during a RACH procedure. In an aspect, the PBCH is transmitted in a synchronization subframe. In another aspect, the PBCH is transmitted in a subframe which does not contain synchronization signals. In another aspect, the PBCH is frequency-division multiplexed with initial access signals, or the PBCH is time-division multiplexed with the initial access signals. In another aspect, the initial access signals may include one or more of a primary synchronization sequence, a secondary synchronization sequence, an extended synchronization sequence, and beam reference signals.

In another aspect, an apparatus (e.g., a base station) for wireless communication is provided. The apparatus may include a memory and at least one processor coupled to the memory and configured to determine RACH parameters and to transmit a message that includes RACH information, based on the determined RACH parameters, via a PBCH. In an aspect, the message that includes RACH information may be transmitted using beamforming. In another aspect, the message is beam-formed in a cell-specific manner by sweeping through one or more angular regions in a cell during different time units. In another aspect, the RACH parameters may include a beam sweep periodicity, a RACH preamble index, a RACH configuration, a RACH format, a RACH periodicity, a base station transmit power, and a RACH power ramping step. In another aspect, the RACH information may be a subset of the RACH parameters. In another configuration, the at least one processor may be further configured to transmit via the PBCH an indication of whether the determined RACH parameters are to be transmitted via an ePBCH. In an aspect, the RACH information may be transmitted via the PBCH based on whether the determined RACH parameters are to be transmitted via the ePBCH. In another configuration, the at least one processor may be further configured to transmit via the PBCH an indication of a periodicity with which the determined RACH parameters are to be transmitted via an ePBCH. In another configuration, the at least one processor may be further configured to transmit at least a subset of the determined RACH parameters via a SIB. In another aspect, the at least the subset of the determined RACH parameters may be transmitted in a cell-specific manner by sweeping through one or more angular regions in a cell. In another aspect, the SIB is transmitted via an ePBCH. In another aspect, the SIB is transmitted via a PDCCH or a PDSCH. In another configuration, the at least one processor may be further configured to transmit at least a subset of the determined RACH parameters during a RACH procedure. In an aspect, the PBCH is transmitted in a synchronization subframe. In another aspect, the PBCH is transmitted in a subframe which does not contain synchronization signals. In another aspect, the PBCH is frequency-division multiplexed with initial access signals, or the PBCH is time-division multiplexed with the initial access signals. In another aspect, the initial access signals may include one or more of a primary synchronization sequence, a secondary synchronization sequence, an extended synchronization sequence, and beam reference signals.

In another aspect, a computer-readable medium of a base station storing computer executable code is provided. The computer-readable medium may include code to determine RACH parameters and to transmit a message that includes RACH information, based on the determined RACH parameters, via a PBCH.

In another aspect of the disclosure, a method, a computer-readable medium, and an apparatus are provided. The apparatus may be a user equipment. The apparatus may receive a message that includes RACH information associated with a base station via a physical broadcast channel. The apparatus may transmit a RACH message to the base station during a RACH procedure based on the received RACH information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
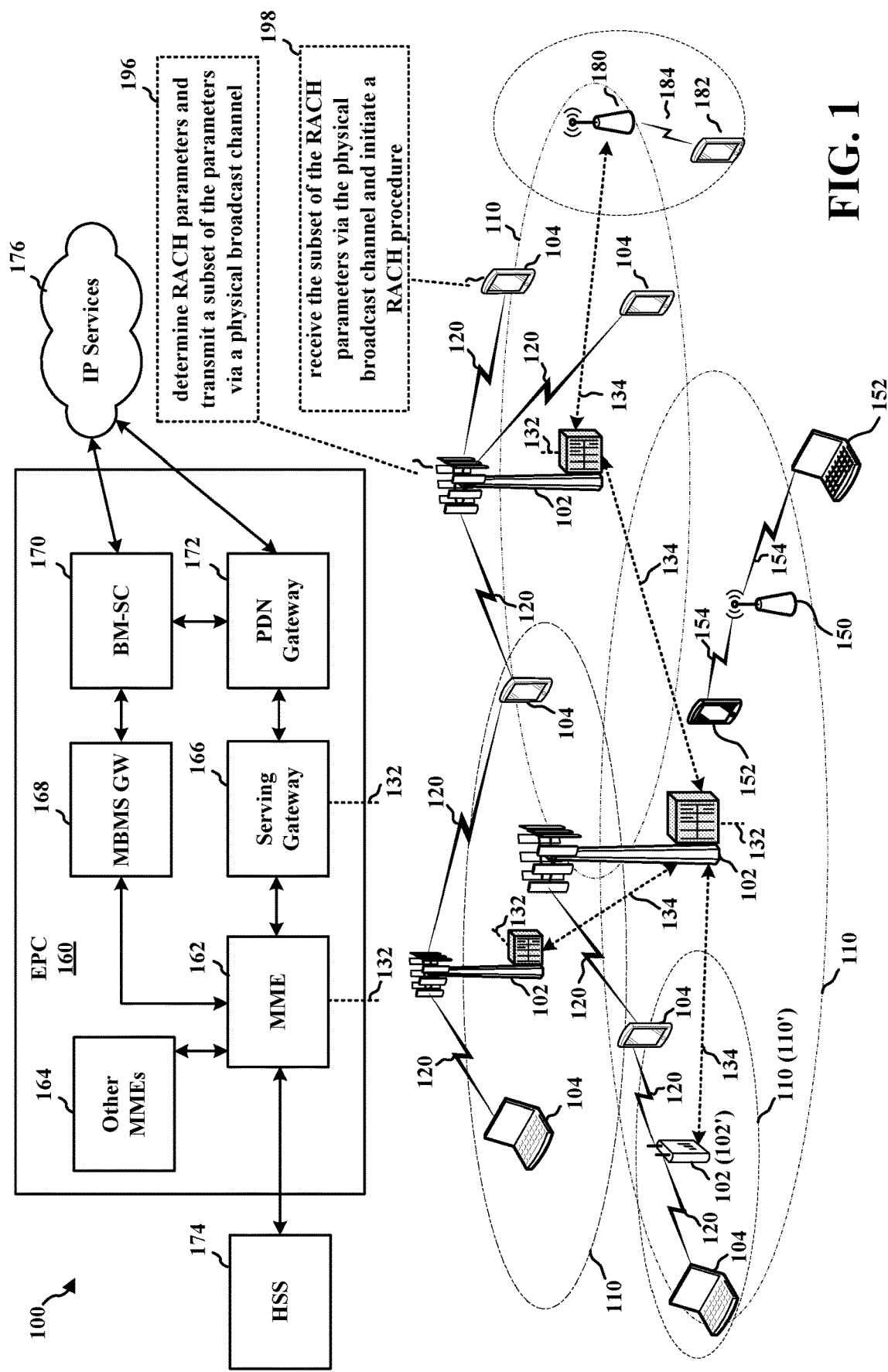
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to determine RACH parameters and transmit a subset of the parameters via a physical broadcast channel (196), and the UE 104 may be configured to receive the subset of the RACH parameters via the physical broadcast channel and initiate a RACH procedure with the eNB 102 (198).

Figures 2A, 2B, 2C, 2D:
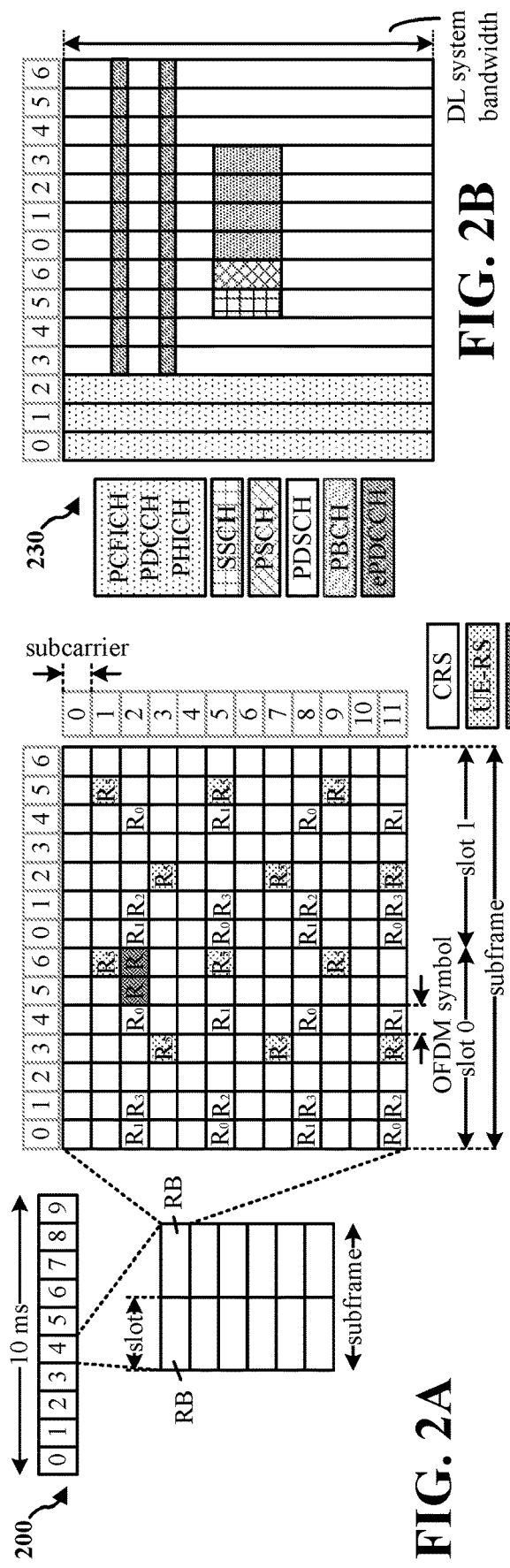
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
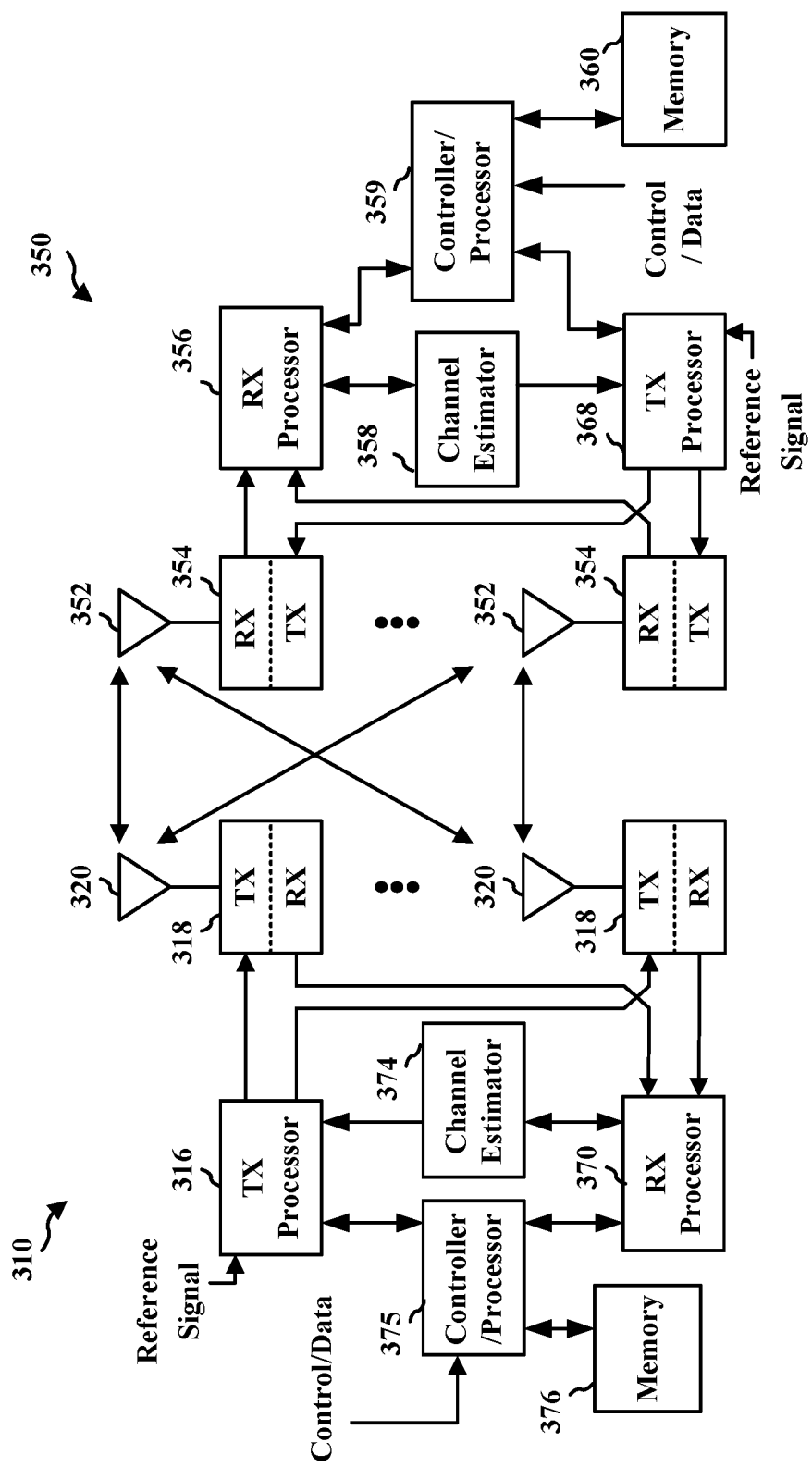
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
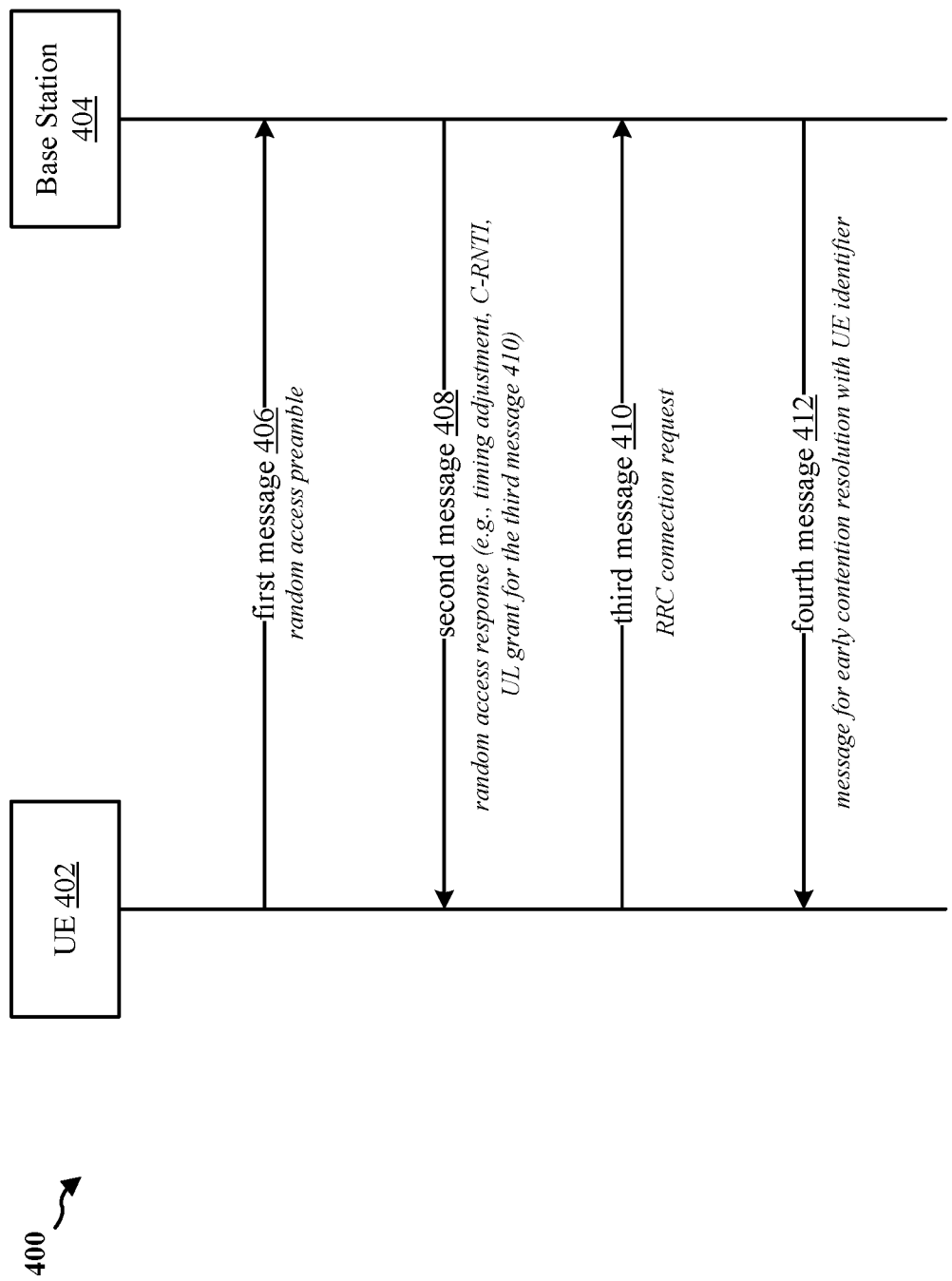
FIG. 4 is a call flow diagram illustrating a RACH procedure.

FIG. 4 is a call flow diagram 400 illustrating a RACH procedure. Referring to FIG. 4, the RACH procedure may enable uplink synchronization between a UE 402 and a base station 404 (e.g., the mmW base station 180). The RACH procedure may also be used to obtain resources for communication. The UE 402 may engage in a contention-based RACH procedure with the base station 404. The RACH procedure may include a message exchange involving four messages—a first message 406, a second message 408, a third message 410, and a fourth message 412. In an aspect, the UE 402 may select an available physical RACH (PRACH) contention-based preamble (or a RACH signature). The preamble may be one of 64 different patterns (or some other number of patterns) generated from Zadoff-Chu sequences, but if multiple UEs have the same preamble, then a collision may occur. The Zadoff-Chu sequence may be generated based on a root value, which may be determined by a RACH preamble index (cell-specific). In an aspect, a subset of the 64 signatures/preambles may be reserved for the contention-free RACH procedure. In an aspect, the UE 402 may select the signature based on the size of the transmission resource needed for transmitting the third message 410. The UE 402 may determine the size of the transmission resource based on a pathloss and a required transmission power for the third message 410. The preamble may be transmitted by the UE 402 to the base station 404 in the first message 406. If the UE 402 does not receive a response from the base station 404 after transmitting the first message 406, then the UE 402 may ramp up the transmission power in a fixed step and retransmit the first message 406.

After receiving the first message 406, the base station 404 may transmit the second message 408 to the UE 402. The second message 408 may be a RACH response (RAR) message sent via the PDSCH. The second message 408 may provide the identity of the detected preamble, a timing alignment instruction that enables the UE 402 to synchronize subsequent uplink transmissions (e.g., a timing advance used to compensate for the round trip delay caused by the distance between the UE 402 and the base station 404), and an initial uplink resource grant for the UE 402 to transmit the third message 410 (e.g., via the PUSCH). The second message 408 may also include a cell radio network temporary identity (C-RNTI) that identifies the UE 402.

The UE 402 may transmit the third message 410 to the base station 404, and the third message 410 may be a Layer 2/Layer 3 message or an RRC connection request message. The third message 410 may also include a UE identifier that identifies the UE 402 (e.g., a random value or a temporary mobile subscriber identity (TMSI)), an RRC connection request, a tracking area update, and/or a scheduling request. The third message 410 may also include a connection establishment clause, indicating why the UE 402 needs to connect to the network. In an aspect, the third message 410 may also include the C-RNTI.

After receiving the third message 410, the base station 404 may adjust one or more transmission parameters for transmitting the fourth message 412 to the UE 402. For example, the base station 404 may select one or more antennas, determine the transmit power on the selected antennas, and/or choose an MCS to use for subsequent transmission to the UE 402. The base station 404 may transmit the fourth message 412 to the UE 402. The fourth message 412 may be a contention resolution message (e.g., if multiple UEs initiated the RACH procedure using the same selected signature the selected UE is indicated). The fourth message 412 may be addressed to the UE identifier included in the third message 410 and may contain a new C-RNTI to be used for further communication.

Referring to FIG. 4, the UE 402 may need different information, known as RACH parameters (e.g., a system frame number, a RACH preamble index, base station transmit power, RACH power ramping step, etc.), before the UE 402 can transmit the first message 406 of the RACH procedure to the base station 404. Such information may be divided into two groups: a MIB and a SIB. In an aspect, the system frame number may be included in the MIB, which may be transmitted by the base station 404 through the PBCH. The remaining RACH parameters may be transmitted in the SIB.

In one aspect of LTE, the SIB may be transmitted through the PDCCH. The PDCCH may be transmitted in a cell-specific manner (e.g., scrambled with a RNTI associated with the cell or a device within the cell) using an omni-directional or quasi-omni-directional beam. In this manner, all UEs regardless of their location in the cell may be able to receive the PDCCH and decode the PDCCH to obtain the SIB and to extract the RACH parameters needed to transmit RACH to the base station 404.

Figure 5B:
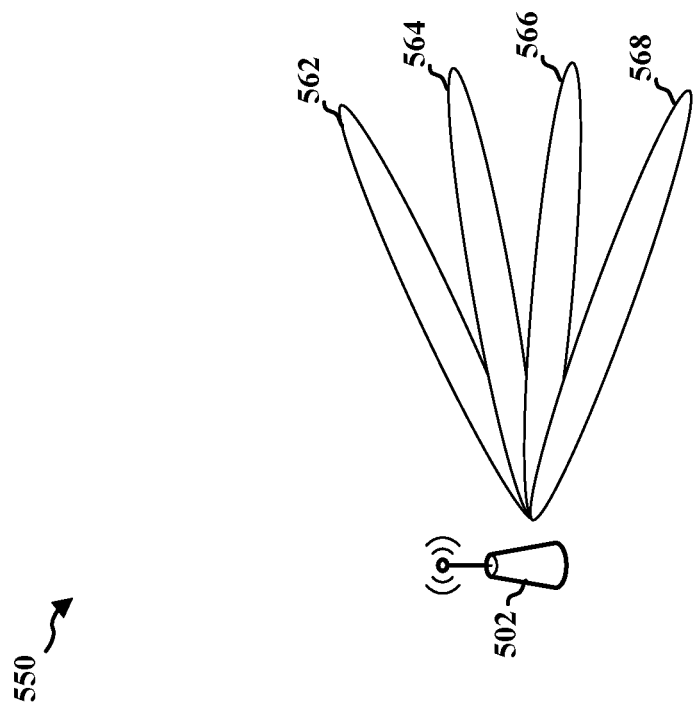
FIGS. 5A and 5B are diagrams of a base station using beamforming and beam sweeping to transmit a synchronization subframe in a mmW system.
Figure 5A:
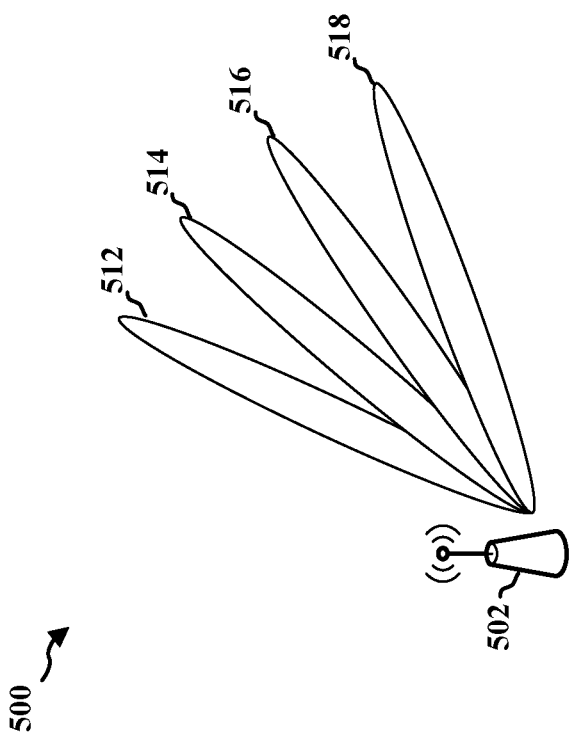

In mmW systems, free space path loss and additional non-line-of-sight loss is high. If the SIB is transmitted through a cell-specific PDCCH, the SIB may not reach all UEs in the mmW system. As such, transmissions in mmW systems may need to be beamformed. FIGS. 5A and 5B are diagrams 500, 550 of a base station 502 using beamforming and beam sweeping to transmit a synchronization subframe in a mmW system. Referring to FIG. 5A, for example, the base station 502 may opt to transmit the SIB using beamforming. If the base station 502 has at least four antenna ports, the base station 502 may directionally sweep the transmission in four directions to transmit four beams 512, 514, 516, and 518 using four antenna ports in a cell-specific manner. The directional sweeping may otherwise be known as beam sweeping. The SIB may be transmitted in the first symbol of a synchronization subframe (e.g., symbol 0 in slot 0 of subframe 0 in FIG. 2A). Referring to FIG. 5B, the base station 502 may sweep in four different directions using the four antenna ports in the second symbol of the synchronization subframe (e.g., symbol 1 in slot 0 of subframe 0 in FIG. 2A) to transmit the four beams 562, 564, 566, 568. Because the base station 502 sweeps in different symbols in FIGS. 5A and 5B, the angular/directional range of the beams for the example in FIG. 5A may be different from the angular/directional range of the beams for the example in FIG. 5B. The beams transmitted by the base station 502 during the same symbol may not be adjacent with each other.

In an aspect, the SIB may be transmitted in a new channel named extended PBCH (ePBCH) or another name. The ePBCH may be a second broadcast channel different from the PBCH. In an aspect, the ePBCH may carry more bits than the PBCH, and accordingly, may have a longer duration than the PBCH. The periodicity of the ePBCH may be greater than the periodicity of the PBCH to reduce overhead such that the effective overhead of the ePBCH and the PBCH are the same even though the ePBCH may carry more bits. Using the ePBCH, the same SIB may be transmitted in 14 directions using 14 symbols. The SIB, however, may have a significant amount of data (e.g., over 100 bits). By repeating the transmission 14 times, SIB transmission via the ePBCH may create a large amount of overhead. To reduce the overhead, the ePBCH may not be transmitted as frequently. The ePBCH may be transmitted once every 100 ms, whereas the PBCH may be transmitted every 5 ms. If a UE decodes a synchronization subframe containing the PBCH (with the MIB), the UE may have to wait for 100 ms to receive to the SIB via the ePBCH before the UE may transmit the first message in the RACH procedure. To reduce the latency, at least some of the RACH parameters may be transmitted via the PBCH.

Figure 6:
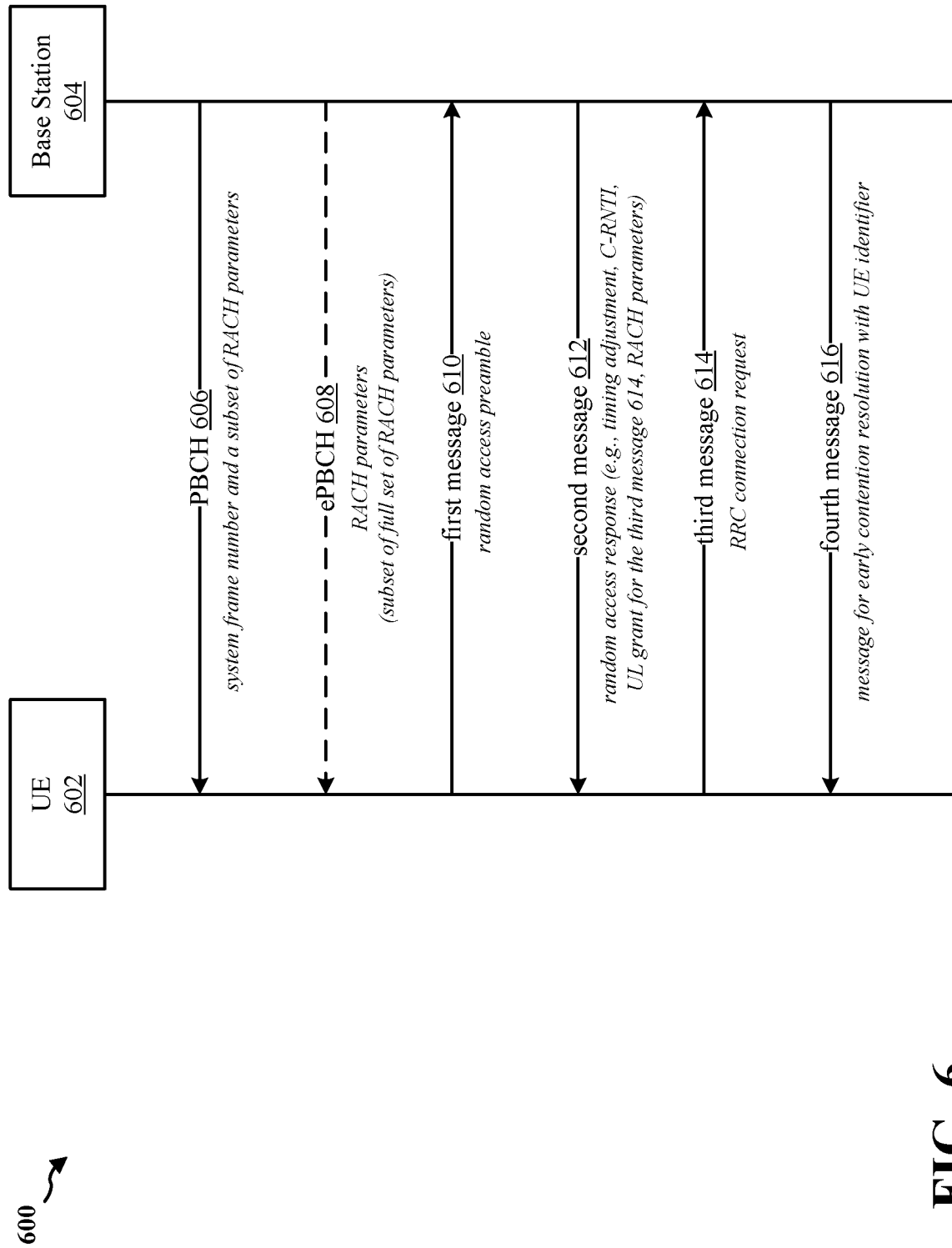
FIG. 6 is a call flow diagram illustrating a method of transmitting RACH parameters via a PBCH.

FIG. 6 is a call flow diagram 600 illustrating a method of transmitting RACH parameters via a PBCH. Referring to FIG. 6, a base station 604 may determine RACH parameters that enable a UE 602 to transmit a first message 610 of the RACH procedure for uplink synchronization. The RACH parameters may include a system frame number, a RACH preamble index (denotes preamble indices for contention-based RACH transmission among available preambles), a contention timer (timer for contention resolution), a maximum HARQ transmission (a maximum number of HARQ transmission for message 3 in the RACH procedure), a base station transmit power (the UE 602 may use the base station transmit power to compute the UE 602 transmit power by measuring the received power of a message from the base station and determining the pathloss based on the measured power and the base station transmit power), a maximum preamble transmit power, a random access response window size (duration of the random access response window), a RACH power ramping step (corresponds to a step size, such as 1 dB, to increase the transmit power for messages if the transmission is unsuccessful), a RACH format (indicating the duration of the RACH), a RACH frequency, a preamble received target power (a target power for receiving the preamble at the base station 604), and a beam sweep periodicity. The beam sweep periodicity denotes the periodicity of sweeping beams in the system. In some systems, beam sweep periodicity may allow the UE 602, for example, to select the resource of RACH transmission which depends on the best beam index. Resource denotes transmission time or tones of RACH transmission. The foregoing list of RACH parameters is not exhaustive and other parameters may be included. In an aspect, the base station 604 may be preconfigured with the RACH parameters. In this aspect, the base station 604 may determine the RACH parameters by looking up the RACH parameters in memory and retrieving the parameters for transmission.

After determining the RACH parameters, the base station 604 may select a subset of the RACH parameters for transmission. The subset of the RACH parameters may be referred to as RACH information. The RACH information may have 9 bits, 23 bits, or some other number of bits. In one example, the RACH information may include the RACH preamble index, the beam sweep periodicity, the RACH frequency, and the RACH format. In another example, other RACH parameters may be included. The RACH information may transmitted in a message via a PBCH 606. In an aspect, the PBCH 606 may have a frequency (or periodicity) of 5 ms or another value. The message may be transmitted using beamforming, similar to the beamforming as shown in FIGS. 5A and 5B, in which the message is beam-formed in a cell-specific manner (e.g., partially scrambled with a RNTI) by sweeping through one or more angular regions in a cell associated with the base station 604 during different time units (e.g., symbols).

In one configuration, the base station 604 may be configured to transmit the full list of RACH parameters via an ePBCH 608. In this configuration, the base station 604 may transmit an indication in the PBCH 606 that indicates whether the full list of RACH parameters will be transmitted via the ePBCH 608. In one aspect, if the base station 604 is not transmitting the RACH parameters via the ePBCH 608, then the base station 604 may transmit the RACH information via the PBCH 606. In another aspect, the base station 604 may transmit the RACH information via the PBCH 606 regardless of whether the base station 604 transmits the full list of RACH parameters via the ePBCH 608. In an aspect, the ePBCH 608 may also contain other parameters apart from RACH related parameters. For example, the ePBCH 608 may include information related to a PDSCH configuration, PUCCH configuration, PUSCH configuration, uplink sounding reference signal configuration, uplink power control information, uplink carrier frequency and bandwidth, etc.

By transmitting the RACH information more frequently via the PBCH 606, the base station 604 may reduce latency because the UE 602 will have enough information to transmit the first message 610 in the RACH procedure immediately after the UE 602 decodes the message (or the synchronization frame) rather than having to wait for the full list of RACH parameters in the ePBCH 608.

In one aspect, the base station 604 may transmit the RACH information such as the RACH preamble index, the RACH configuration, the beam sweep periodicity, and/or the RACH format in the MIB via the PBCH 606 so that each UE in the cell may find the base RACH sequence and the allotted time to transmit RACH. The remaining RACH parameters, not including those that make up the RACH information (e.g., the base station transmit power, the RACH power ramping step, and other parameters) may be transmitted through the SIB. The SIB may be transmitted in a cell-specific manner by sweeping through one or more angular regions of the cell. The SIB may be transmitted via the ePBCH 608. Alternatively, the SIB may be transmitted via a dedicated PDCCH or via the PDSCH. In another configuration, instead of being transmitted in the SIB, one or more of the remaining RACH parameters may be transmitted during the RACH procedure, such as in the second message 612 of the RACH procedure, to be used by the UE 602 for transmitting the third message 614.

In another aspect, the base station 604 may transmit an indication via the PBCH 606 that indicates a periodicity with which the full list of RACH parameters is to be transmitted via the ePBCH 608. If the UE 602 determines that the periodicity has a time duration greater than a threshold (e.g., greater than 200 ms), then the UE 602 may determine not to wait for the full list of RACH parameters in the ePBCH 608 and initiate the RACH procedure based on the RACH information received via the PBCH 606.

In another aspect, the subframe in which the PBCH is transmitted may be frequency-division multiplexed or time-division multiplexed as later described with respect to FIGS. 7 and 8.

After receiving the RACH information via the PBCH 606, the UE 602 may determine to transmit the first message 610 to the base station 604. The UE 602 may determine the RACH preamble to use based on the RACH preamble index indicated in the RACH information from the PBCH 606. The UE 602 may determine the frequency on which to transmit the first message 610 based on the RACH information. The UE 602 may determine the duration of the RACH procedure based on the RACH format.

In an aspect, if the UE 602 receives an indication that the RACH parameters will be transmitted via the ePBCH 608, then the UE 602 may wait for the RACH parameters before transmitting the first message 610. In another aspect, the UE 602 may not wait for the RACH parameters via the ePBCH 608 before transmitting the first message 610. In another aspect, if the UE 602 receives an indication that the RACH parameters will not be transmitted via the ePBCH 608, then the UE 602 may transmit the first message 610 immediately after receiving the RACH information via the PBCH 606. In another aspect, the UE 602 may receive an indication of the periodicity with which the RACH parameters are to be transmitted by the base station 604 via the ePBCH 608. If the UE 602 determines that the periodicity leads to a latency above a threshold, then the UE 602 may determine not to wait for the RACH parameters and to transmit the first message 610 immediately after receiving the RACH information from the PBCH 606.

In an aspect, having received the RACH information over the PBCH 606, the UE 602 may perform initial uplink transmission (e.g., transmit the first message 610) for uplink synchronization without decoding any other channel except synchronization channels (e.g., the PSS, SSS, BRS, and ESS).

After transmitting the first message 610, the UE 602 may receive the second message 612 from the base station 604. The second message 612 may include a timing adjustment for the UE 602, uplink resource grants for transmitting a third message 614, etc. In an aspect, the second message 612 may also include RACH parameters. The RACH parameters may be different from those transmitted in the PBCH 606, and the RACH parameters may also be transmitted via the ePBCH 608.

Subsequently, the UE 602 may transmit the third message 614 to the base station 604 that indicates an RRC connection request, and the base station 604 may respond by transmitting the fourth message 616 to the UE 602. The fourth message 616 may be a contention resolution message with an identifier associated with the UE 602.

Figure 7:
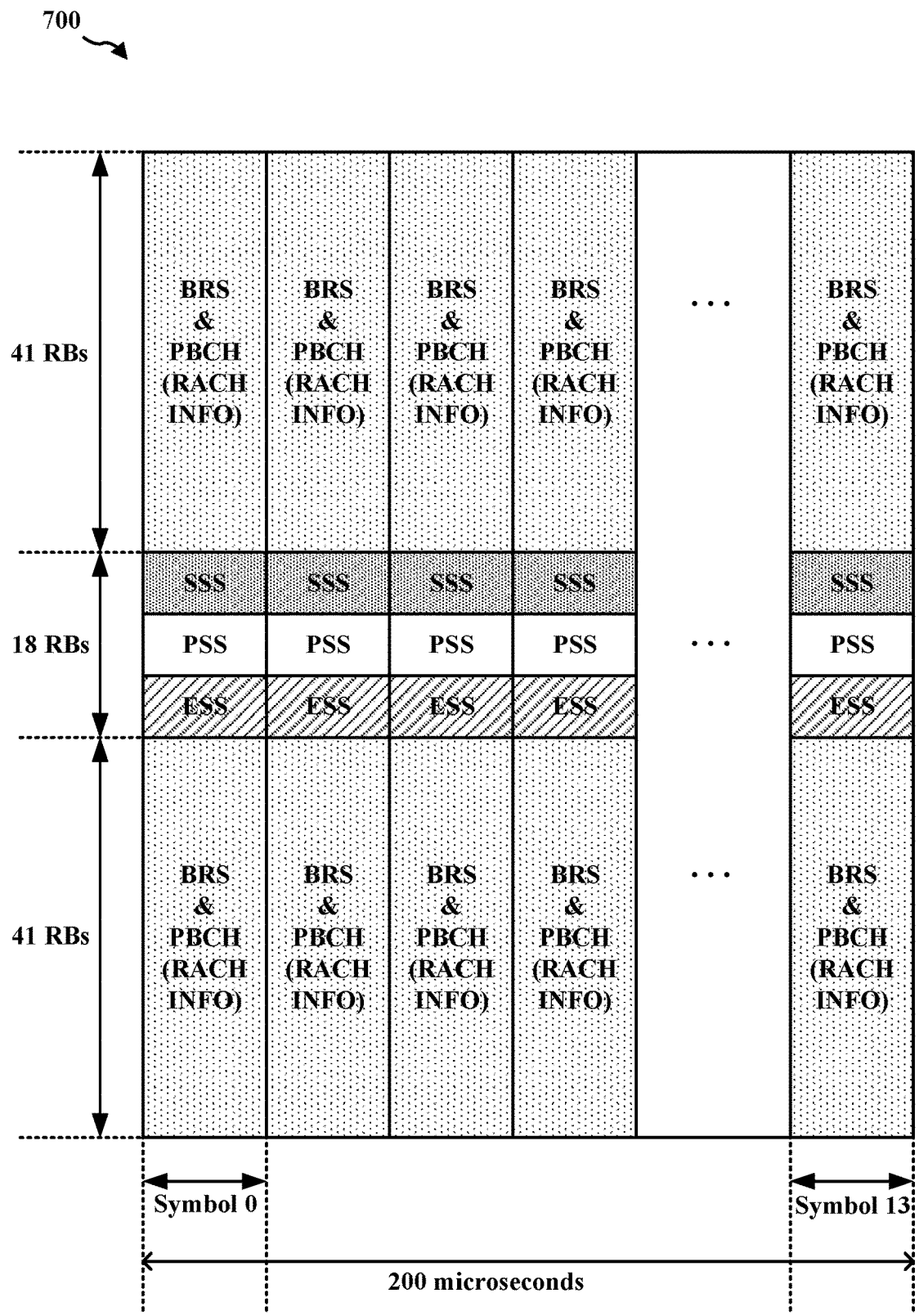
FIG. 7 is a diagram of a frequency-division multiplexed synchronization subframe.

FIG. 7 is a diagram 700 of a frequency-division multiplexed synchronization subframe. The synchronization subframe may be divided into 14 symbols, from symbol 0 to symbol 13. Each symbol may have 100 resource blocks (RBs) for communication. As an example, each RB may have 12 subcarriers, which would mean that each symbol may have 1,200 subcarriers (or tones). The first 41 RBs may be used to carry beam reference signals (BRSs) and PBCHs, which may include RACH information. The next 18 RBs may carry a SSS, a PSS, and an extended synchronization signal (ESS). The next 41 RBs may carry BRSs and PBCHs, and like the first 41 RBs, the PBCHs may include RACH information.

The beam transmitted by each antenna port may change from symbol to symbol. As discussed above, for example, for a first symbol, four beams from four antenna ports of the base station may cover one angular range (e.g., as illustrated in FIG. 5A), while four beams from the four antenna ports may cover another angular range for a different symbol (e.g., as illustrated in FIG. 5B). For example, the base station may have 1, 2, 4, or 8 active antenna ports. Within each symbol, the base station transmits a PSS, an SSS, an ESS, a PBCH, and a BRS. Each of the PSS, the ESS, the SSS, and the PBCH is transmitted by all antenna ports of the base station on the same subcarriers throughout different symbols of the synchronization subframe.

In an aspect, the angular space of the coverage area of a cell may be divided into three sectors, where each sector is associated with 120 degrees. A base station may provide coverage for one or more sectors. Each symbol of the synchronization subframe may be associated with a different range in direction/angle. For example, the 14 symbols may collectively cover 120 degrees (one sector). In this example, because there are 14 symbols (thus 14 direction ranges) per subframe and there are 4 antenna ports in this example, the base station may transmit beams in 56 (14×4) different directions. In another example, the symbols within a subframe may cover the angular range more than once. In such an example, if there are 14 symbols within a subframe, the first seven symbols may cover 120 degrees, and then the next seven symbols may cover the same 120 degrees.

Figure 8:
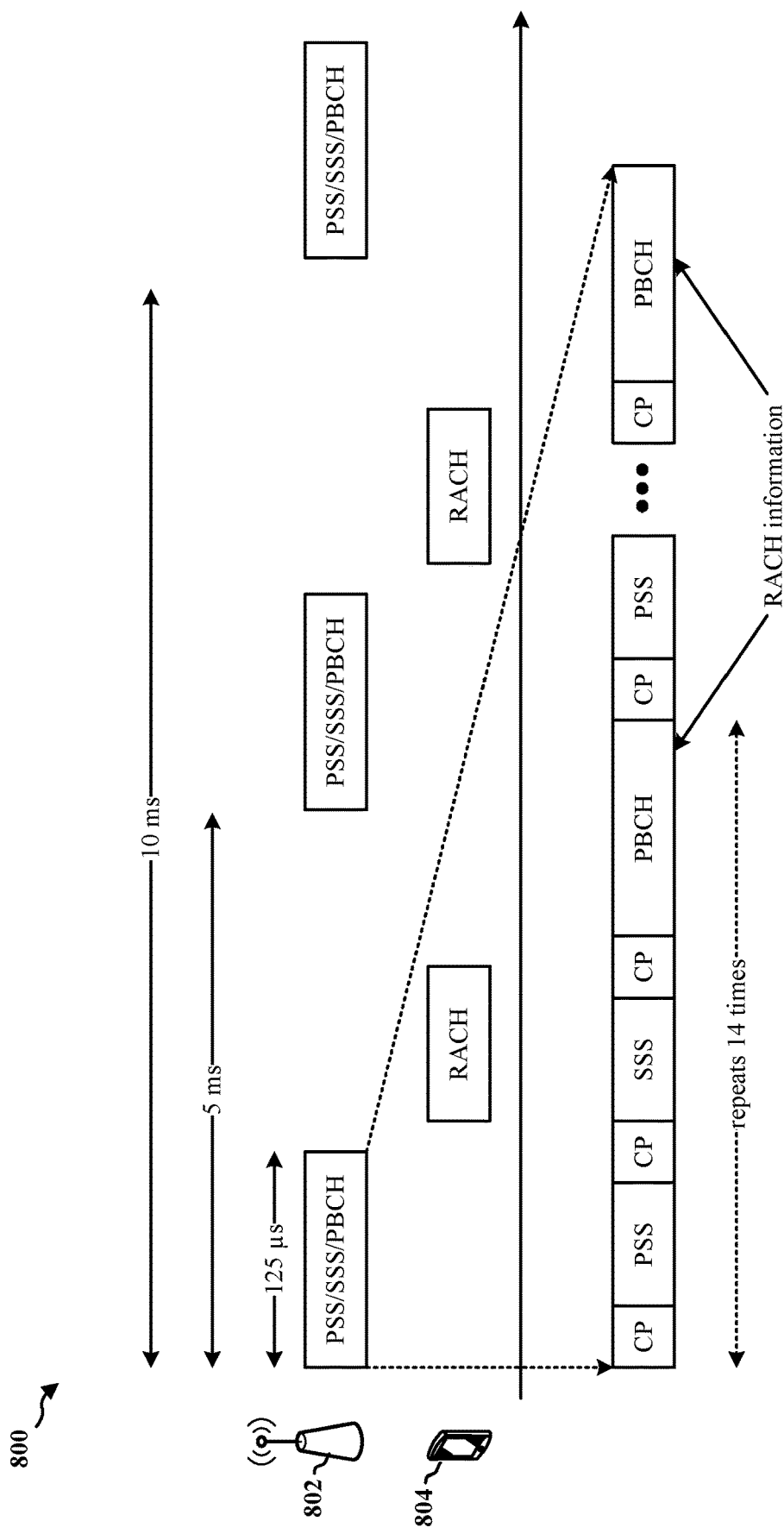
FIG. 8 is a diagram of a time-division multiplexed synchronization subframe.

FIG. 8 is a diagram 800 of a time-division multiplexed synchronization subframe. The synchronization subframe may be divided into 14 symbols, from symbol 0 to symbol 13. The tone-spacing within each symbol may be 60 or 120 kHz. Referring to FIG. 8, a base station 802 may transmit a synchronization subframe with PSS, SSS, and PBCH, each separated by a cyclic prefix. In another aspect, the synchronization subframe may also have ESS as shown in FIG. 7. The PBCH may include the RACH information. The PBCH may be frequency-division multiplexed with beam reference signals. Upon receiving and decoding the PBCH, a UE 804 may transmit a first message (RACH message) in the RACH procedure immediately without waiting for the SIB, which may have the remaining RACH parameters that are not in the PBCH.

Figure 9:
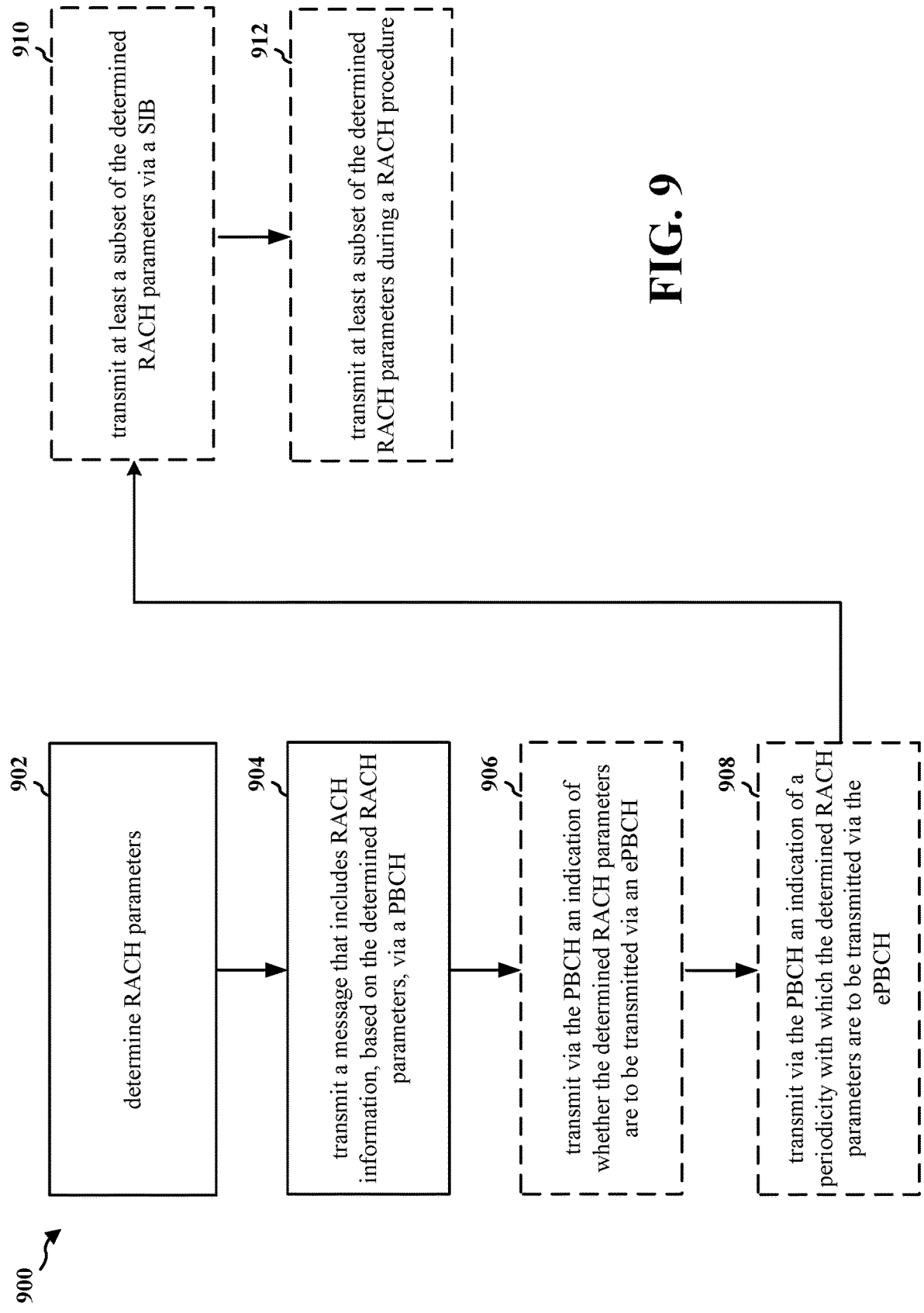
FIG. 9 is a flowchart of a method of wireless communication.

FIG. 9 is a flowchart 900 of a method of wireless communication. The method may be performed by a base station (e.g., the eNB 102, the mmW base station 180, the apparatus 1102/1102'). At 902, the base station may determine RACH parameters. For example, referring to FIG. 6, the base station may correspond to the base station 604. The base station 604 may determine the RACH parameters that include a system frame number, a RACH preamble index, a contention timer, a maximum HARQ transmission, a base station transmit power, a maximum preamble transmit power, a random access response window size, a RACH power ramping step, a RACH format, a RACH frequency, a preamble received target power, and a beam sweep periodicity. The base station 604 may determine the RACH parameters by retrieving the RACH parameters from memory and providing the parameters for transmission. In an aspect, the base station 604 may determine the RACH parameters based on channel conditions and/or on a base station maximum transmit power.

At 904, the base station may transmit a message that includes RACH information, based on the determined RACH parameters, via a PBCH. For example, referring to FIG. 6, the base station 604 may transmit a message that includes the RACH information via the PBCH 606. In an aspect, the RACH information may be a subset of the RACH parameters. In another aspect, the base station 604 may transmit the message using beamforming, and the beamformed message may be beam swept in a cell-specific manner through one or more angular regions in a cell served by the base station 604. The message may be beam swept during symbols using a synchronization subframe.

At 906, the base station may transmit via the PBCH an indication of whether the determined RACH parameters are to be transmitted via an ePBCH. For example, referring to FIG. 6, the base station 604 may transmit via the PBCH 606 an indication of whether the determined RACH parameters are to be transmitted via the ePBCH 608. In one aspect, the base station 604 may transmit the RACH information via the PBCH 606 based on whether the determined RACH parameters are to be transmitted via the ePBCH 608. For example, if the base station 604 will not transmit the RACH parameters via the ePBCH 608, then the base station 604 may transmit the RACH information via the PBCH 606.

At 908, the base station may transmit via the PBCH an indication of a periodicity with which the determined RACH parameters are to be transmitted via an ePBCH. For example, referring to FIG. 6, the base station 604 transmits via the PBCH 606 an indication that the determined RACH parameters are to be transmitted every 100 ms. If the periodicity is too long (e.g., greater than 150 ms), the UEs receiving the indication may determine not to wait for the RACH parameters before transmitting a RACH message (e.g., the first message 610).

At 910, the base station may transmit at least a subset of the determined RACH parameters via a SIB. For example, referring to FIG. 6, the base station 604 may transmit at least a subset of the determined RACH parameters via a SIB. In one aspect, the at least the subset of the determined RACH parameters may include the remaining RACH parameters that were not transmitted with the RACH information. In another respect, the at least the subset of the determined RACH parameters may include the full list of RACH parameters. In another aspect, the RACH parameters may be transmitted in a cell-specific manner by sweeping through one or more angular regions in a cell. In another aspect, the SIB may be transmitted via the ePBCH 608. In another aspect, the SIB may be transmitted via the PDCCH or the PDSCH.

At 912, the base station may transmit at least a subset of the determined RACH parameters during a RACH procedure. For example, referring to FIG. 6, the base station 604 may transmit the at least the subset of the determined RACH parameters in the second message 612 during the 4-message RACH procedure.

Figure 10:
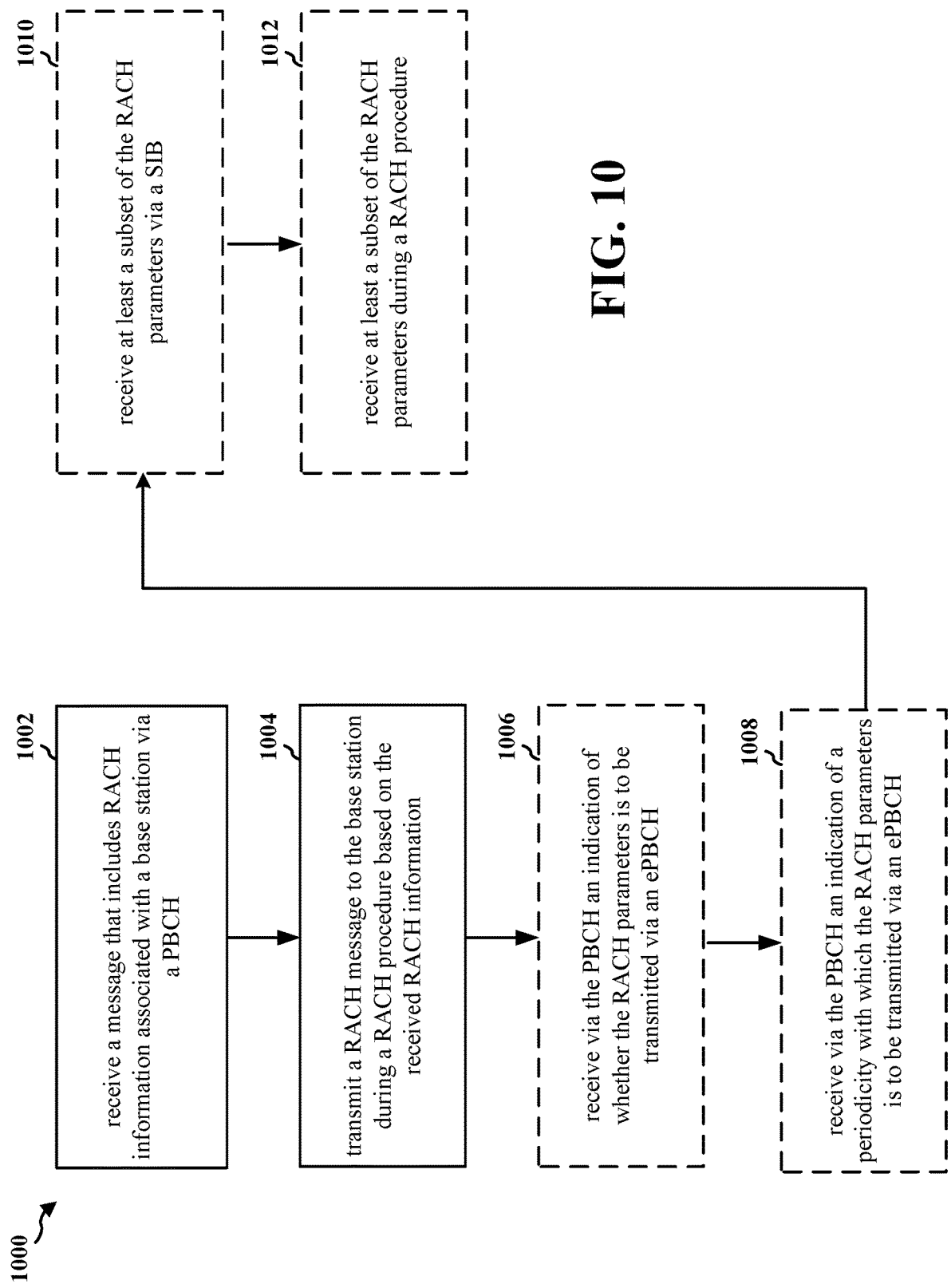
FIG. 10 is a flowchart of a method of wireless communication.

FIG. 10 is a flowchart 1000 of a method of wireless communication. The method may be performed by a UE (e.g., the UE 602, the apparatus 1302/1302'). At 1002, the UE may receive a message that includes RACH information associated with a base station via a PBCH. For example, referring to FIG. 6, the UE may be the UE 602. The UE 602 may receive a message that include RACH information associated with the base station 604 via the PBCH 606.

At 1004, the UE may transmit a RACH message to the base station during a RACH procedure based on the received RACH information. For example, referring to FIG. 6, the UE 602 may transmit the first message 610 (a RACH message) to the base station 604 during a RACH procedure. The first message 610 may be transmitted based on the RACH information received via the PBCH 606.

At 1006, the UE may receive via the PBCH an indication of whether the RACH parameters are to be transmitted via an ePBCH. For example, referring to FIG. 6, the UE 602 may receive via the PBCH 606 an indication of whether the base station 604 will transmit the RACH parameters via the ePBCH 608.

At 1008, the UE may receive via the PBCH an indication of a periodicity with which the RACH parameters are to be transmitted via an ePBCH. For example, referring to FIG. 6, the UE 602 may receive via the PBCH 606 an indication of a periodicity (e.g., every 100 ms) with which the base station 604 is to transmit the RACH parameters via the ePBCH 608.

At 1010, the UE may receive at least a subset of the RACH parameters via a SIB. For example, referring to FIG. 6, the UE 602 may receive at least the subset of RACH parameters via a SIB. The subset of the RACH parameters may include the remaining RACH parameters that were not received by the UE 602 in the RACH information.

At 1012, the UE may receive at least a subset of the RACH parameters during a RACH procedure. For example, referring to FIG. 6, the UE 602 may receive a subset of the RACH parameters in the second message 612.

Figure 11:
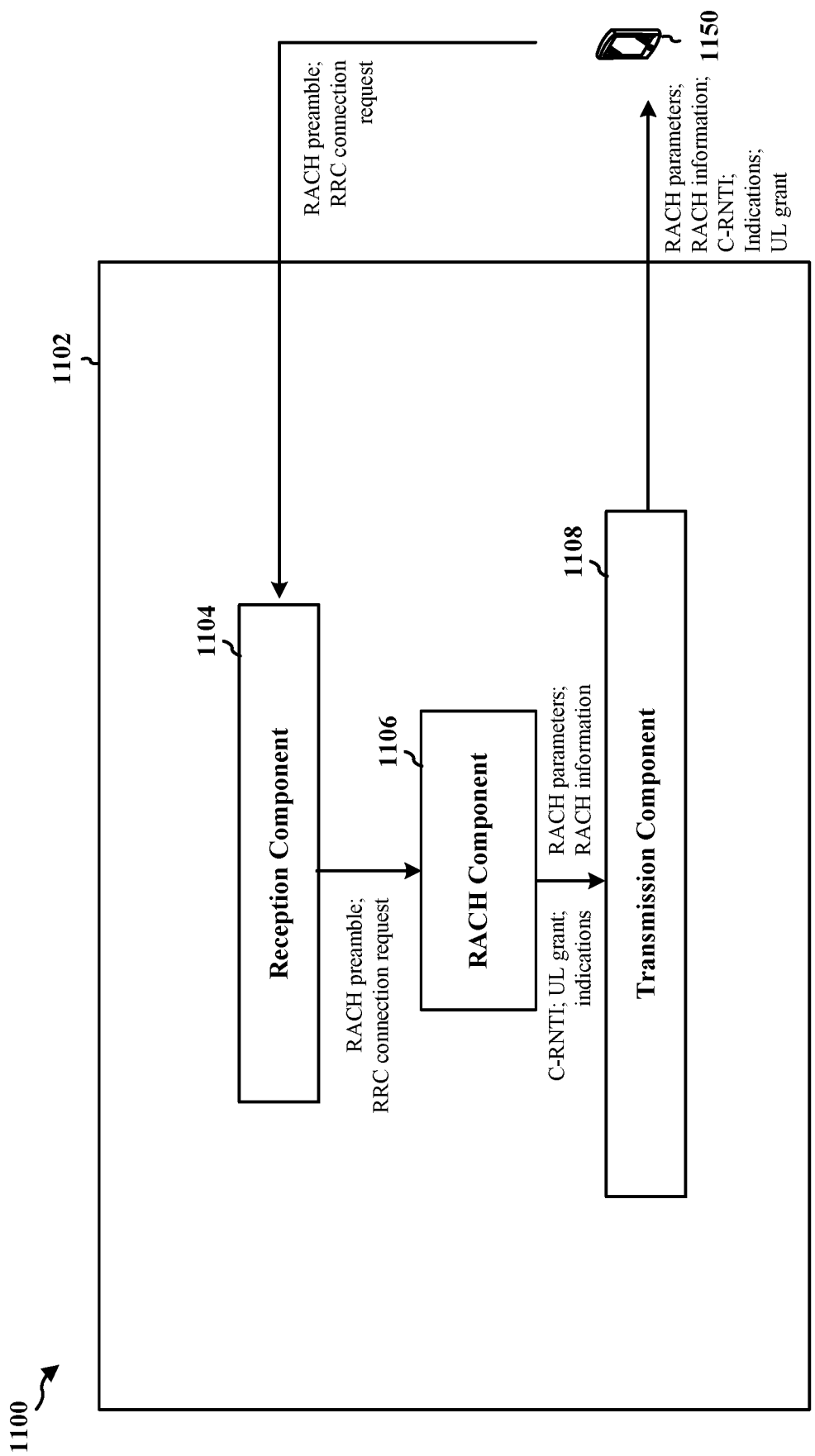
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be an eNB or a mmW base station. The apparatus includes a reception component 1104, a RACH component 1106, and a transmission component 1108. The RACH component 1106 may be configured to determine RACH parameters. The transmission component 1108 may be configured to transmit a message that includes RACH information, based on the determined RACH parameters, via a PBCH. In an aspect, the message that includes RACH information may be transmitted using beamforming. In another aspect, the message may be beam-formed in a cell-specific manner by sweeping through one or more angular regions in a cell during different time units. In another aspect, the RACH parameters may include a beam sweep periodicity, a RACH preamble index, a RACH configuration, a RACH format, a RACH periodicity, a base station transmit power, and a RACH power ramping step. In another aspect, the RACH information may be a subset of the RACH parameters. In one configuration, the transmission component 1108 may be configured to transmit via the PBCH an indication of whether the determined RACH parameters are to be transmitted via an ePBCH. In an aspect, the RACH information may be transmitted via the PBCH based on whether the determined RACH parameters are to be transmitted via the ePBCH. In another configuration, the transmission component 1108 may be configured to transmit via the PBCH an indication of a periodicity with which the determined RACH parameters are to be transmitted via an ePBCH. In another configuration, the transmission component 1108 may be configured to transmit at least a subset of the determined RACH parameters via a SIB. In an aspect, the at least the subset of the determined RACH parameters may be transmitted in a cell-specific manner by sweeping through one or more angular regions in a cell. In another aspect, the SIB may be transmitted via an ePBCH. In another aspect, the SIB may be transmitted via a PDCCH or a PDSCH. In another configuration, the transmission component 1108 may be configured to transmit at least a subset of the determined RACH parameters during a RACH procedure. In an aspect, the PBCH may be frequency-division multiplexed with initial access signals, or the PBCH may be time-division multiplexed with the initial access signals. In another aspect, the initial access signals may include one or more of a primary synchronization sequence, a secondary synchronization sequence, an extended synchronization sequence, and beam reference signals.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
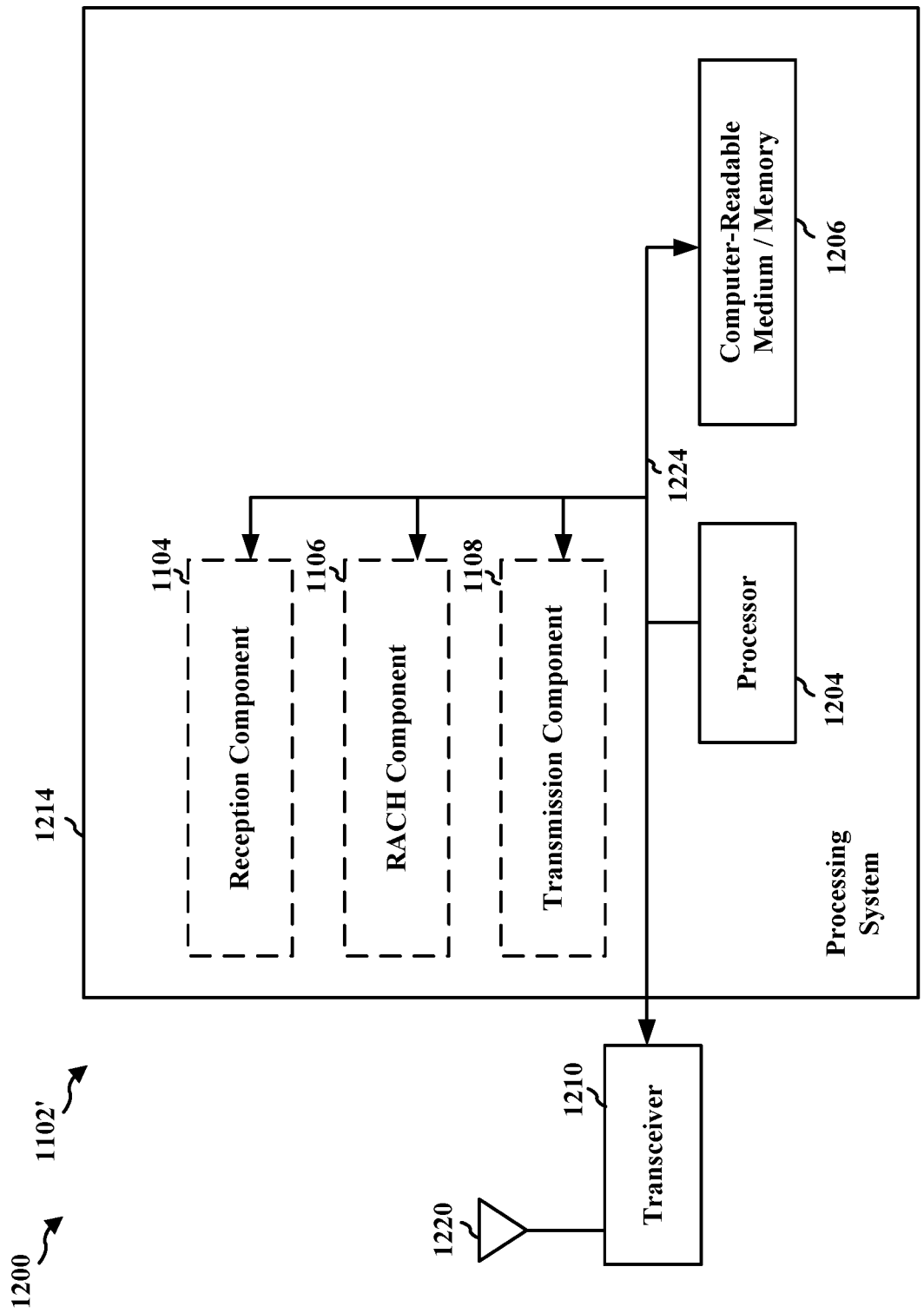
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the eNB 310 (or the mmW base station 180) and may include the memory 376 and/or at least one of the TX processor 316, the RX processor 370, and the controller/processor 375.

In one configuration, the apparatus 1102/1102' for wireless communication includes means for determining RACH parameters. The apparatus may include means for transmitting a message that includes RACH information, based on the determined RACH parameters, via a PBCH. In an aspect, the message that includes RACH information may be transmitted using beamforming. In another aspect, the message may be beam-formed in a cell-specific manner by sweeping through one or more angular regions in a cell during different time units. In another aspect, the RACH parameters may include a beam sweep periodicity, a RACH preamble index, a RACH configuration, a RACH format, a RACH periodicity, a base station transmit power, and a RACH power ramping step. In another aspect, the RACH information may be a subset of the RACH parameters. In one configuration, the apparatus may include means for transmitting via the PBCH an indication of whether the determined RACH parameters are to be transmitted via an ePBCH. In an aspect, the RACH information may be transmitted via the PBCH based on whether the determined RACH parameters are to be transmitted via the ePBCH. In another configuration, the apparatus may include means for transmitting via the PBCH an indication of a periodicity with which the determined RACH parameters are to be transmitted via an ePBCH. In another configuration, the apparatus may include means for transmitting at least a subset of the determined RACH parameters via a SIB. In an aspect, the at least the subset of the determined RACH parameters may be transmitted in a cell-specific manner by sweeping through one or more angular regions in a cell. In another aspect, the SIB may be transmitted via an ePBCH. In another aspect, the SIB may be transmitted via a PDCCH or a PDSCH. In another configuration, the apparatus may include means for transmitting at least a subset of the determined RACH parameters during a RACH procedure. In an aspect, the PBCH may be frequency-division multiplexed with initial access signals, or the PBCH may be time-division multiplexed with the initial access signals. In another aspect, the initial access signals may include one or more of a primary synchronization sequence, a secondary synchronization sequence, an extended synchronization sequence, and beam reference signals. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
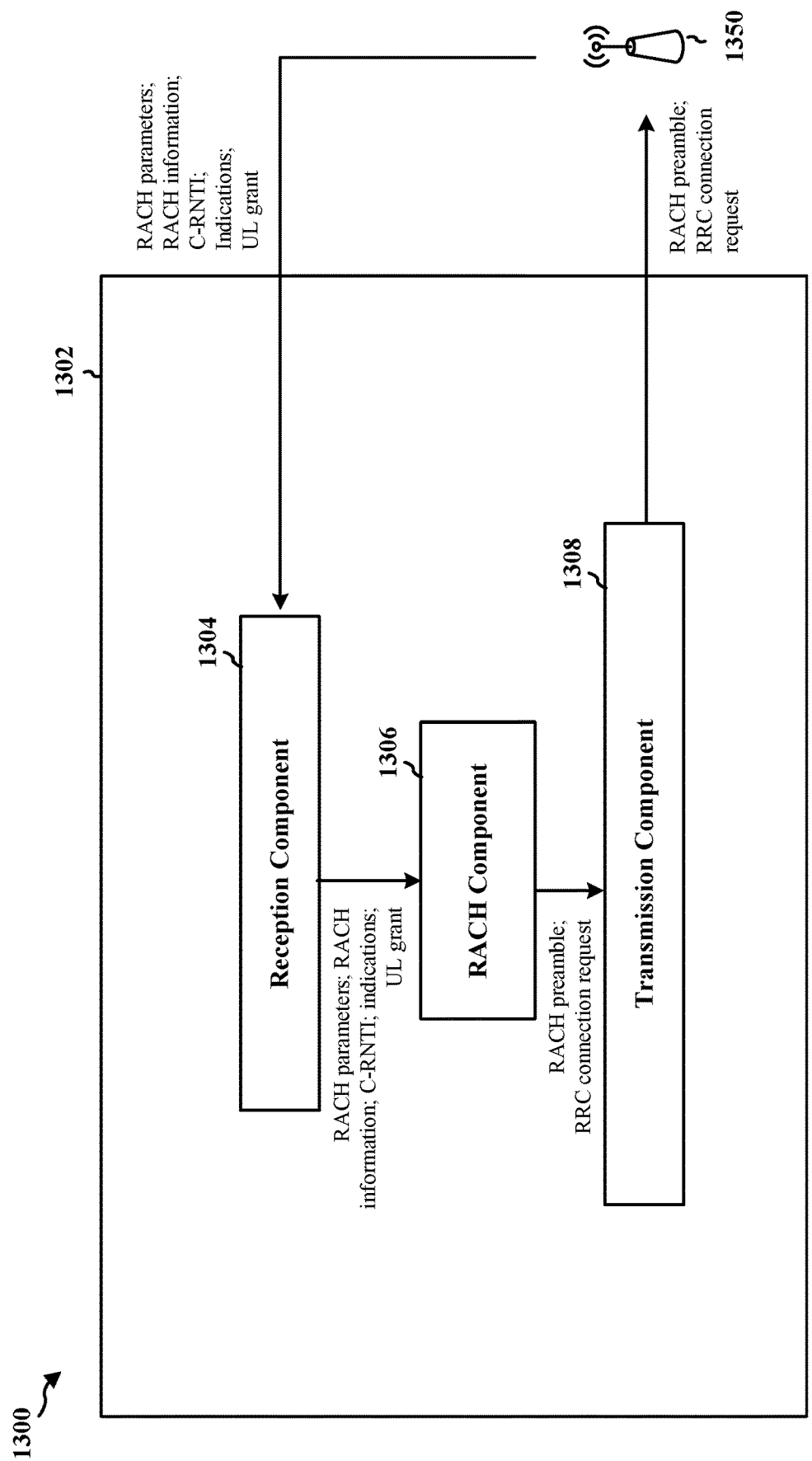
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus includes a reception component 1304, a RACH component 1306, and a transmission component 1308. The reception component 1304 may be configured to receive a message that includes RACH information associated with a base station 1350 via a PBCH. The transmission component 1308 may be configured to transmit a RACH message to the base station 1350 during a RACH procedure based on the received RACH information. In an aspect, the RACH information may be a subset of RACH parameters associated with the base station 1350. The RACH parameters may include a beam sweep periodicity, a RACH preamble index, a RACH configuration, a RACH format, a RACH frequency, a base station transmit power, and a RACH power ramping step. In one configuration, the reception component 1304 may be configured to receive via the PBCH an indication of whether the RACH parameters are to be transmitted via an ePBCH. In another aspect, the RACH information may be received based on whether the RACH parameters are to be transmitted via the ePBCH. In another aspect, the RACH message may be transmitted during the RACH procedure based on the RACH information if the RACH parameters will not be transmitted via the ePBCH. In another aspect, the RACH message may be transmitted during the RACH procedure based on a periodicity with which the RACH parameters are to be received in the ePBCH. In another configuration, the reception component 1304 may be configured to receive via the PBCH an indication of a periodicity with which the RACH parameters are to be transmitted via an ePBCH. In another configuration, the reception component 1304 may be configured to receive at least a subset of the RACH parameters via a SIB. In an aspect, the SIB may be received via an ePBCH. In another aspect, the SIB may be received via a PDCCH or a PDSCH. In another configuration, the reception component 1304 may be configured to receive at least a subset of the RACH parameters during a RACH procedure. In an aspect, the RACH message may be transmitted to the base station 1350 before the apparatus receives a SIB from the base station 1350 via a PDCCH, a PDSCH, or an ePBCH. In another aspect, the message that includes RACH information may be beamformed.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
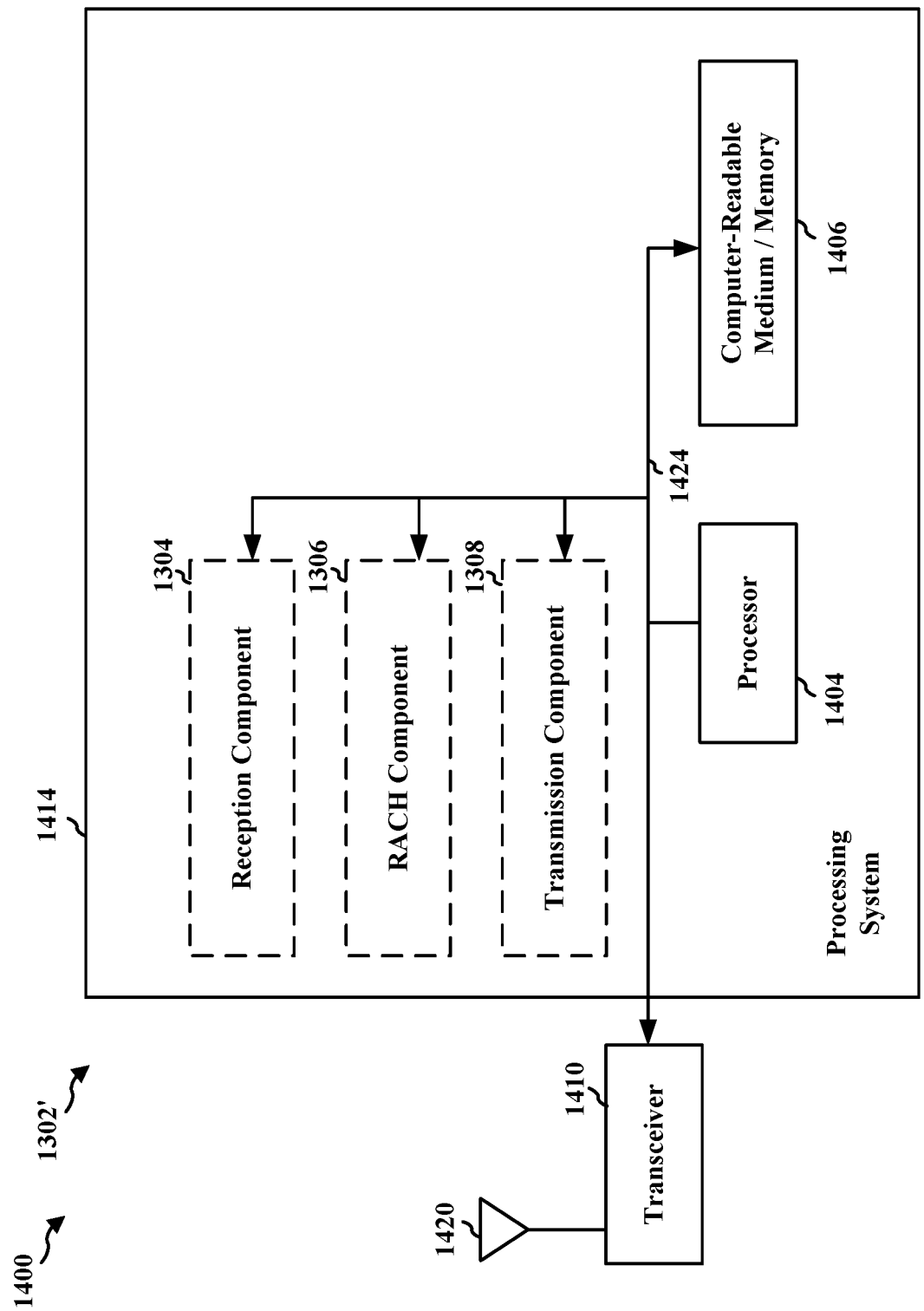
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving a message that includes RACH information associated with a base station via a PBCH. The apparatus includes means for transmitting a RACH message to the base station during a RACH procedure based on the received RACH information. In an aspect, the RACH information may be a subset of RACH parameters associated with the base station. The RACH parameters may include a beam sweep periodicity, a RACH preamble index, a RACH configuration, a RACH format, a RACH frequency, a base station transmit power, and a RACH power ramping step. In one configuration, the apparatus may include means for receiving via the PBCH an indication of whether the RACH parameters are to be transmitted via an ePBCH. In another aspect, the RACH information may be received based on whether the RACH parameters are to be transmitted via the ePBCH. In another aspect, the RACH message may be transmitted during the RACH procedure based on the RACH information if the RACH parameters will not be transmitted via the ePBCH. In another aspect, the RACH message may be transmitted during the RACH procedure based on a periodicity with which the RACH parameters are to be received in the ePBCH. In another configuration, the apparatus may include means for receiving via the PBCH an indication of a periodicity with which the RACH parameters are to be transmitted via an ePBCH. In another configuration, the apparatus may include means for receiving at least a subset of the RACH parameters via a SIB. In an aspect, the SIB may be received via an ePBCH. In another aspect, the SIB may be received via a PDCCH or a PDSCH. In another configuration, the apparatus may include means for receiving at least a subset of the RACH parameters during a RACH procedure. In an aspect, the RACH message may be transmitted to the base station before the apparatus receives a SIB from the base station via a PDCCH, a PDSCH, or an ePBCH. In another aspect, the message that includes RACH information may be beamformed. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
   determining random access channel (RACH) parameters;
   transmitting a message that includes RACH information via a physical broadcast channel (PBCH) or an extended PBCH (ePBCH), wherein the RACH information comprises a subset of the determined RACH parameters including at least one of a beam sweep periodicity, a base station transmit power, a RACH configuration, a RACH frequency, or a RACH power ramping step;
   transmitting via the PBCH an indication of whether the subset of the determined RACH parameters are to be transmitted via the ePBCH; and
   receiving a RACH message from a user equipment (UE) during a RACH procedure based on the transmitted RACH information before transmitting remaining RACH parameters of the subset of the determined RACH parameters via the ePBCH, wherein the remaining RACH parameters are not in the RACH information transmitted via the PBCH.

2. The method of claim 1, wherein the message that includes RACH information is transmitted using beamforming.

3. The method of claim 2, the message is beam-formed in a cell-specific manner by sweeping through one or more angular regions in a cell during different time units.

4. The method of claim 1, wherein the RACH parameters include the beam sweep periodicity, a RACH preamble index, the RACH configuration, a RACH format, a RACH periodicity, the base station transmit power, and the RACH power ramping step.

5. The method of claim 1, wherein the RACH information is transmitted via the PBCH or the ePBCH based on whether the subset of the determined RACH parameters are to be transmitted via the ePBCH.

6. The method of claim 1, further comprising transmitting via the PBCH an indication of a periodicity with which the subset of the determined RACH parameters are to be transmitted via the ePBCH.

7. The method of claim 1, further comprising transmitting the subset of the determined RACH parameters via a system information block (SIB).

8. The method of claim 7, wherein the subset of the determined RACH parameters are transmitted in a cell-specific manner by sweeping through one or more angular regions in a cell.

9. The method of claim 7, wherein the SIB is transmitted via the ePBCH.

10. The method of claim 7, wherein the SIB is transmitted via a physical downlink control channel (PDCCH) or a physical downlink shared channel (PDSCH).

11. The method of claim 1, further comprising transmitting the subset of the determined RACH parameters during a RACH procedure.

12. The method of claim 1, wherein the PBCH is transmitted in a synchronization subframe.

13. The method of claim 1, wherein the PBCH is transmitted in a subframe which does not contain synchronization signals.

14. The method of claim 1, wherein the PBCH is frequency-division multiplexed with initial access signals, or the PBCH is time-division multiplexed with the initial access signals.

15. The method of claim 14, wherein the initial access signals comprise one or more of a primary synchronization sequence, a secondary synchronization sequence, an extended synchronization sequence, and beam reference signals.

16. A base station for wireless communication, comprising:
  means for determining random access channel (RACH) parameters;
  means for transmitting a message that includes RACH information via a physical broadcast channel (PBCH) or an extended PBCH (ePBCH), wherein the RACH information comprises a subset of the determined RACH parameters including at least one of a beam sweep periodicity, a base station transmit power, a RACH configuration, a RACH frequency, or a RACH power ramping step;
  wherein the means for transmitting is configured to transmit via the PBCH an indication of whether the subset of the determined RACH parameters are to be transmitted via the ePBCH; and
  means for receiving a RACH message from a user equipment (UE) during a RACH procedure based on the transmitted RACH information before transmitting remaining RACH parameters of the subset of the determined RACH parameters via the ePBCH, wherein the remaining RACH parameters are not in the RACH information transmitted via the PBCH.

17. A base station for wireless communication, comprising:
  a memory; and
  at least one processor coupled to the memory and configured to:
    determine random access channel (RACH) parameters;
    transmit a message that includes RACH information via a physical broadcast channel (PBCH) or an extended PBCH (ePBCH), wherein the RACH information comprises a subset of the determined RACH parameters including at least one of a beam sweep periodicity, a base station transmit power, a RACH configuration, a RACH frequency, or a RACH power ramping step;
    transmit via the PBCH an indication of whether the subset of the determined RACH parameters are to be transmitted via the ePBCH; and
    receive a RACH message from a user equipment (UE) during a RACH procedure based on the transmitted RACH information before transmitting remaining RACH parameters of the subset of the determined RACH parameters via the ePBCH, wherein the remaining RACH parameters are not in the RACH information transmitted via the PBCH.

18. The base station of claim 17, wherein the message that includes RACH information is transmitted using beamforming.

19. The base station of claim 18, the message is beam-formed in a cell-specific manner by sweeping through one or more angular regions in a cell during different time units.

20. The base station of claim 17, wherein the RACH parameters include the beam sweep periodicity, a RACH preamble index, the RACH configuration, a RACH format, a RACH periodicity, the base station transmit power, and the RACH power ramping step.

21. The base station of claim 17, wherein the RACH information is transmitted via the PBCH or the ePBCH based on whether the subset of the determined RACH parameters are to be transmitted via the ePBCH.

22. The base station of claim 17, wherein the at least one processor is further configured to transmit via the PBCH an indication of a periodicity with which the subset of the determined RACH parameters are to be transmitted via the ePBCH.

23. The base station of claim 17, wherein the at least one processor is further configured to transmit the subset of the determined RACH parameters via a system information block (SIB).

24. The base station of claim 23, wherein the subset of the determined RACH parameters are transmitted in a cell-specific manner by sweeping through one or more angular regions in a cell.

25. The base station of claim 23, wherein the SIB is transmitted via the ePBCH.

26. The base station of claim 23, wherein the SIB is transmitted via a physical downlink control channel (PDCCH) or a physical downlink shared channel (PDSCH).

27. The base station of claim 17, wherein the at least one processor is further configured to transmit the subset of the determined RACH parameters during a RACH procedure.

28. The base station of claim 17, wherein the PBCH is transmitted in a synchronization subframe.

29. The base station of claim 17, wherein the PBCH is transmitted in a subframe which does not contain synchronization signals.

30. A non-transitory computer-readable medium of a base station storing computer executable code, comprising code to:
- determine random access channel (RACH) parameters;
- transmit a message that includes RACH information via a physical broadcast channel (PBCH) or an extended PBCH (ePBCH), wherein the RACH information comprises a subset of the determined RACH parameters including at least one of a beam sweep periodicity, a base station transmit power, a RACH configuration, a RACH frequency, or a RACH power ramping step;
- transmit via the PBCH an indication of whether the subset of the determined RACH parameters are to be transmitted via the ePBCH; and
- receive a RACH message from a user equipment (UE) during a RACH procedure based on the transmitted RACH information before transmitting remaining RACH parameters of the subset of the determined RACH parameters via the ePBCH, wherein the remaining RACH parameters are not in the RACH information transmitted via the PBCH.

* * * * *